Patented Feb. 18, 1930

1,747,538

UNITED STATES PATENT OFFICE

MARCEL BERNIER AND ANDRÉ DURIEZ, OF COPENAFORD, FRANÇOIS DURIEZ, OF STEENE, AND HENRI SCHOTSMANS, OF TREZENNES, FRANCE

INDUSTRIAL PROCESS FOR THE TREATMENT OF DISTILLER'S WASH, AND OTHER BY-PRODUCTS AND AGRICULTURAL OR INDUSTRIAL RESIDUES

No Drawing. Application filed March 29, 1923, Serial No. 628,618, and in France January 19, 1923.

This invention relates to the treatment of industrial and agricultural wastes or by-products containing organic bodies, such as carbohydrates, organic bases, amides, amines, amino-bodies and the like.

As examples of such wastes or by-products, distiller's wash and the effluents from wool scouring works may be given.

According to the present invention such wastes after sterilizing and adjustment of their hydrogen ion concentration are subjected to fermentation by means of bacteria possessing powerful saccharolytic and acid-aminolytic properties. These bacteria are of the *Bacillus aminophilus* species.

In this way from sterile distiller's wash, for instance, organic acids, mainly acetic acid, propionic acid and lactic acid and also ammonia, acetone and several other products resulting from the action of the bacteria on the carbohydrates and nitrogen-containing substances are obtained.

The invention will be described in detail and by way of example, as applied to the treatment of distiller's wash.

A medium comprising substances obtained by the moderate or partial hydrolysis of vegetable or animal proteins or from the products obtained by the aseptic autolysis of yeast collected by continuous centrifuging of the bottoms or foots of fermentation vats (the medium, if derived from vegetable proteins, being prepared from vegetable material rich in proteins and containing large proportions of diaminoacids and organic phosphorous compounds) contained in a small vessel is sown with pure cultures of micro-organisms of the character indicated.

The pure culture thus obtained is used for sowing a larger vessel containing distiller's wash to which a suitable proportion of the products of hydrolysis mentioned above has been added. The fermentation vat is sown with this material.

All these operations are performed with the necessary precautions for securing asepsis in order to avoid infection, the purity of the fermentation being checked at frequent intervals.

The several operations can be performed in closed vessels adapted to be sterilized; continuous aeration is usually necessary and in such case the intensity of the sterilized air current should be varied according to the nature of the bacteria used.

Suitable devices are employed for insuring constancy of temperature of the vessels and fermentation vats, the temperature of which will depend upon the nature of bacteria.

It is only possible to secure the regularity of fermentation and high yields by maintaining the hydrogen ion concentration of the fermenting liquid as close as possible to the degree which is particularly suitable to the species of bacteria used. This constancy is obtained by checking the reaction of the medium at very frequent intervals by the electro-metric method with the employment of a potentiometer device with a hydrogen electrode or by some other means conveniently adapted for industrial use and by neutralizing the acids formed as they are produced either by the introduction into the fermentation vat of a calculated quantity of a sterile alkaline solution or by any other suitable means.

The adjustment of the reaction of distiller's wash submitted to fermentation and of the media originally sown is also conveniently effected by the electrometric method.

Solutions of sodium, potassium or calcium hydroxide or of the carbonates of the alkali metals may be used for regulating the hydrogen ion concentration of the material undergoing fermentation.

The volatile products which are formed are separated by distillation after being set free by means of suitable reagents while the residue is converted into a complex manure.

The bacterium which has been used in the hereinafter described operation is an acid-aminolytic and saccharolytic bacterium.

This bacterium, which is an aerobe, requires suitable aeration and a temperature of 37° C. As the same is very sensitive to the variations in the reaction of the culture media, a culture medium having a hydrogen ion concentration is maintained as constantly as possible at pH7.

First this bacteria is shown in a Roux box containing peptone nutritive gelose. After growing in the hot chamber the bacteria of this culture are collected in order to sow a flask containing five litres of molasses wash enriched by the addition of nitrogen-containing substances (peptone in the proportion of 20 grms. per litre); the hydrogen ion concentration of this liquid being adjusted to pH7, a small quantity of a solution of $Na_2CO_3$ 0.7 grms. per litre is added thereto, the same acting as a moderator of the moment the fermentation begins.

A small vat is filled with molasses wash enriched with the products resulting from the hydrolysis of albuminoid substances (in the present case peanut cake). This operation which is performed by means of the usual processes is followed so as to secure a liquid containing simultaneously true peptone, albumoses and amino-acids. In this way the wash of the small vat is enriched with 15 grms. of soluble nitrogen-containing substances per litre.

The hydrogen ion concentration of the liquid is then adjusted to pH7 by means of a concentrated solution of $Na_2CO_3$ sterilized under pressure and directed into the vat under aseptic conditions. A small quantity of sodium carbonate as above indicated is then added in order to act as a moderator. The temperature is raised to 37° C. and the liquid is aerated by means of a current of sterile air which is introduced at the lower part of the vat and constantly agitates the liquid therein. The product thus obtained is then added to two flasks containing distiller's wash in full fermentation and prepared as above indicated.

The fermentation starts from the eighth hour; frequent tests of the hydrogen ion concentration permits the reaction of the liquid to be followed and when this reaction, due to the production of organic acids by the bacteria, reaches pH6 to 8 the liquid is again adjusted to the suitable pH by the addition to the vat of a sterile and cold solution of $Na_2CO_3$. This operation is repeated as many times as necessary in order to constantly maintain the liquid at the same concentration in H ions of pH7.

The bacteria being sufficiently developed (18 hours after sowing) the contents of this vat is introduced under aseptic conditions into a large fermentation vat containing a sterile molasses wash, also brought by means of a solution of $Na_2CO_3$ to the desired hydrogen ion concentration (pH7) and a proportion of a solution of sodium carbonate containing 7 grms. per litre as in the previous operations is also added. The temperature is brought to 37° C. and the liquid is aerated in the same manner as was the small vat.

Fermentation takes three hours after sowing and in the wash are formed volatile organic acids, principally acetic acid (90 to 95%, the rest being composed of propionic acid and some traces of butyric acid), fixed organic acids, principally lactic acid and a variable quantity of ammonia with traces of aldehydes and acetone.

Samples collected every hour permit the progress of fermentation to be followed and the acid reaction (hydrogen ion concentration) of the medium to be maintained substantially constant as described with reference to the small vat.

The content of volatile acids which was at the beginning 5 grms. per litre of wash rises to 17 grms. within fifty-fours.

The ammonia, previously at 0.2 grms. per litre, rises in the same time to 0.8 grms. per litre.

The volatile products formed are distilled off in any suitable manner.

It must be understood that the present process can be used in the same manner as above described in connection with other by-products and residues of an agricultural or industrial character as, for instance, the effluent resulting from the scouring of wool.

In the above described example, the concentration in H of the liquid during fermentation must be maintained to about pH=7. However this figure must of course vary according to the nature of the fermentable liquid as used and according to the employed microbian species. Practically, the optima concentration can vary between about pH=6 and pH=8.

Having now described our invention, what we claim as new and desire to secure by Letters Patent is:

1. Process for the treatment of distiller's wash and other by-products and residues containing fermentable substances, consisting in sterlizing said distiller's wash and the like, in adjusting their hydrogen ion concentration and in then submitting them to fermentation in a sterilizable closed vessel under the action of true acidaminolytic bacteria of the type of *Bacillus aminophilus*, the said hydrogen ion adjustment corresponding to the limits ranging from about pH=6 to pH=8 and being optimum selected for every fermentable substance in virtue of a previous test.

2. Process for the treatment of distiller's wash and other by-products and residues containing fermentable substances, consisting in sterilizing said distiller's wash and the like, in adjusting their hydrogen ion concentration, in then submitting these wastes to fermentation in a sterilizable closed vessel under the action of true aminolytic bacteria of the type of *Bacillus aminophilus*, the said hydrogen ion adjustment being comprised within the limits between about pH=6 and pH=8 and such that the microbia as used will give in the utilized wastes the maximum production of acetic acid, and in regulating the fermentation by maintaining to the said optimum value the hydrogen ion concentration of said wastes during all the time of fermentation.

3. Process for the treatment of distiller's wash and other by-products and residues containing fermentable substances, consisting in introducing these wastes into a sterilizable closed vessel, in sterlizing them in this closed vessel, in sowing them with a pure culture of true acidaminolytic bacteria of the type of the *Bacillus aminophilus*, in injecting air therein during the fermentation, in measuring before the fermentation and at intervals during the fermentation the concentration of said distiller's wash in H ions, and in maintaining the said concentration in hydrogen ions between about pH=6 and pH=8.

4. Process for treating by fermentation distiller's wash and other by-products and residues consisting in sterilizing such distiller's wash and the like, in enriching in nitrogen-containing and phosphorus-containing substances a small quantity of said distiller's wash and the like which is to be submitted to fermentation by adding thereto the products of a partial hydrolysis of proteic substances, in sowing this small quantity of wash thus enriched with a pure culture of a true acidaminolytic bacteria of the *Bacillus aminophilus* type which is extremely saccharolytic, in aseptically adding said pure culture to the entire remainder of the said wash contained in a closed and sterilizable vessel of large size, and in effecting the main fermentation in the said vessel, the concentration of said wash in H ions being maintained during the whole time of the fermentation between about pH=6 and pH=8.

5. Process for the treatment of distiller's wash and other by-products and residues containing fermentable substances, consisting in sterilizing such distiller's wash or the like, in enriching a small quantity of said wash which is to be submitted to fermentation, with the products of a partial hydrolysis of proteic substances rich in phosphorus-containing substances and in diaminoacids, in aseptically adding to the small quantity of enriched medium a pure culture of an acidaminolytic and saccharolytic bacteria of the *Bacillus aminophilus* type, in assuring the development of said bacteria in the pure state in said small quantity of wash, in adding said small quantity, when in full fermentation, to the remainder of said wash to be fermented which is contained in a sterilizable closed vessel and in effecting the main fermentation in said closed vessel, the said wash being maintained during the whole period of fermentation at a concentration in H ions comprised within the limits from about pH=6 to pH=8 and at the temperature which is the most favourable for the development of the particular bacteria employed.

In testimony that we claim the foregoing as our invention we have signed our names.

MARCEL BERNIER.
ANDRÉ DURIEZ.
FRANÇOIS DURIEZ.
HENRI SCHOTSMANS.